US011934471B2

(12) United States Patent
Franczyk et al.

(10) Patent No.: US 11,934,471 B2
(45) Date of Patent: *Mar. 19, 2024

(54) NATIVE INTEGRATION OF ARBITRARY DATA SOURCES

(71) Applicant: WP Company LLC, Washington, DC (US)

(72) Inventors: Gregory Franczyk, Brooklyn, NY (US); Timothy Kim, Falls Church, VA (US); William Maxim Van Wazer, Arlington, VA (US)

(73) Assignee: WP COMPANY LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/944,386

(22) Filed: Sep. 14, 2022

(65) Prior Publication Data
US 2023/0020045 A1    Jan. 19, 2023

Related U.S. Application Data

(63) Continuation of application No. 15/221,283, filed on Jul. 27, 2016, now Pat. No. 11,449,560.

(60) Provisional application No. 62/197,355, filed on Jul. 27, 2015.

(51) Int. Cl.
*G06F 17/00* (2019.01)
*G06F 16/9535* (2019.01)
*G06F 40/143* (2020.01)
*G06F 40/154* (2020.01)
*G06F 40/186* (2020.01)

(52) U.S. Cl.
CPC ........ *G06F 16/9535* (2019.01); *G06F 40/143* (2020.01); *G06F 40/154* (2020.01); *G06F 40/186* (2020.01)

(58) Field of Classification Search
CPC .. G06F 16/9535; G06F 40/143; G06F 40/154; G06F 40/186
See application file for complete search history.

(56) References Cited

U.S. PATENT DOCUMENTS

| | | | |
|---|---|---|---|
| 6,622,168 | B1 | 9/2003 | Datta |
| 7,533,107 | B2 | 5/2009 | Gupta et al. |
| 8,407,238 | B2 | 3/2013 | Trevor et al. |
| 8,595,186 | B1 | 11/2013 | Mandyam |

(Continued)

OTHER PUBLICATIONS

Kuppusamy, K. S., and Gnanasekaran Aghila. "MORPES: A Model For Personalized Rendering Of Web Content On Mobile Devices." arXiv preprint arXiv:1203.3613 (2012) (Year: 2012).*

(Continued)

*Primary Examiner* — Andrew T McIntosh
(74) *Attorney, Agent, or Firm* — Nixon & Vanderhye, PC

(57) ABSTRACT

A technique for more efficiently integrating external content for web page display is disclosed. The technique includes identifying a plurality of page features for displaying a web page, selecting a corresponding content resolver from a plurality of content resolvers stored in the memory for each of the identified page features. The selecting may be in accordance with the end user device. The technique may also include rendering the web page for display on the end user device in accordance with one or more parameters specified in the corresponding content resolver.

15 Claims, 6 Drawing Sheets

(56) References Cited

U.S. PATENT DOCUMENTS

| | | |
|---|---|---|
| 2004/0034651 A1 | 2/2004 | Gupta et al. |
| 2004/0225958 A1 | 11/2004 | Halpert |
| 2009/0171968 A1 | 7/2009 | Kane |
| 2009/0248883 A1 | 10/2009 | Suryanarayana |
| 2010/0332513 A1 | 12/2010 | Azar |
| 2014/0229818 A1* | 8/2014 | Goswami ............ G06F 16/9577 715/234 |
| 2015/0095767 A1 | 4/2015 | Ebner |

OTHER PUBLICATIONS

Ott, Jörg, and Dirk Kutscher. "Bundling the Web: HTTP over DTN." Proceedings of WNEPT (2006) (Year: 2006).*

Laakko, Timo, and Tapio Hiltunen, "Adapting web content to mobile user agents," IEEE Internet computing 9.2 (2005): 46-53 (Year: 2005).

Yin, Xinyi, and Wee Sun Lee. "Using link analysis to improve layout on mobile devices." Proceedings of the 13$^{th}$ international conference on World Wide Web, 2004 (Years: 2004).

* cited by examiner

```
/* Content Resolver Interface */
public interface TemplateResolver {
    public int getPriority();
    public ResolvedTemplateRequest resolve(String uri, String queryString);
}

/* Data Access Service Interface */
public interface DataAccessService<T implements ContentConfig> {
    public Map<String, Object> retrieveContent(T config) throws
        ContentNotFoundException, InvalidContentConfigException,
        InvalidContentException;
}
```

602 — Content Resolver Interface
604 — Data Access Service Interface

FIG. 6

NATIVE INTEGRATION OF ARBITRARY DATA SOURCES

CROSS-REFERENCE TO RELATED APPLICATIONS

This application is a continuation of U.S. application Ser. No. 15/221,283, filed on Jul. 27, 2016, which claims the benefit of U.S. Provisional Patent Application No. 62/197,355 filed on Jul. 27, 2015, which is hereby incorporated by reference in its entirety.

FIELD

The subject matter below relates to rendering of web-accessible content.

BACKGROUND

Page rendering engines for creating browsable web pages are known. These engines enable users to relatively quickly create a web page including content. In particular, after the content is obtained and its arrangement on the web page is decided, the page rendering engine may do all, or a substantial part, of the rendering without the user having to write programming code for that purpose. Page Builder™ by Site Origin™ is a plugin that provides some rendering capabilities on the WordPress™ platform. These conventional page rendering techniques may be used by organizations, such as, for example, media services organizations, to distribute their product (e.g., content) via the web.

However, as many media services move to delivering their products via the web, and as the sources for content continue to evolve, improved page rendering engines that are even more capable of efficiently leveraging available resources are desired.

SUMMARY

An organization, such as, for example, a news organization which publishes a newspaper and/or magazine on a regular basis in a web-accessible form, may rely on various sources for its content. While the sources for some of the published content may be internal, such organizations also increasingly rely on growing numbers of more diverse external sources for at least some of the published content. These external sources may include platforms such as WordPress™, social media platforms (e.g., Twitter™, Facebook™, Google+™), partner feeds, etc. The external sources of content may differ in the types, volume, arrangement/formatting, accessibility, update frequency etc.

Conventional page rendering engines may not provide for efficiently integrating with such diverse external content or data sources. For example, many conventional page rendering engines require that a user (or developer) creates custom programming code for each external source from which he/she wants to obtain content. However, such custom code development becomes cumbersome when the number of external sources grow and/or when the external sources keep changing their interfaces. Moreover, conventional page rendering engines often operate by importing third party content to the page rendering engine, and then, once the importing has completed, converting the imported third party content to a format native to the page rendering engine. These are often impediments to the efficient development of web-accessible content presentations.

Exemplary embodiments of the subject matter described herein provide a page rendering system, including a page rendering engine which efficiently integrates with external content or data sources. Page rendering engines according to embodiments are able to directly integrate with external systems (e.g. external content sources), including third party systems. More particularly embodiments enable the page rendering engine to handle third party content as an internal object (i.e., an object internal to the page rendering engine), allowing it to cache, persist, and pass the content around as an internal object. With this capability, it is no longer necessary to first import data from third party systems into an internal database, and then to transform the imported object into a first party system object (i.e., object in the native form of the system). This saves time and effort, reduces duplication of content, and resolves many issues related to updates and changes to content throughout the page rendering system.

The page rendering system according to embodiments enables clients (e.g., web site developers) to create web pages and templates through a web admin interface by selecting, positioning, and configuring a set of page features (i.e., atomic elements on pages, also referred to as modules). Moreover, the page rendering system according to embodiments may also be responsible for performing all, or substantially all, of the work to build the rendered response (e.g., the requested web page) to requesting end users (e.g., readers/visitors of the web site).

BRIEF DESCRIPTION OF THE DRAWINGS

FIG. 6 illustrates example interfaces and example input parameters according to some embodiments.

DETAILED DESCRIPTION

Figure 1:
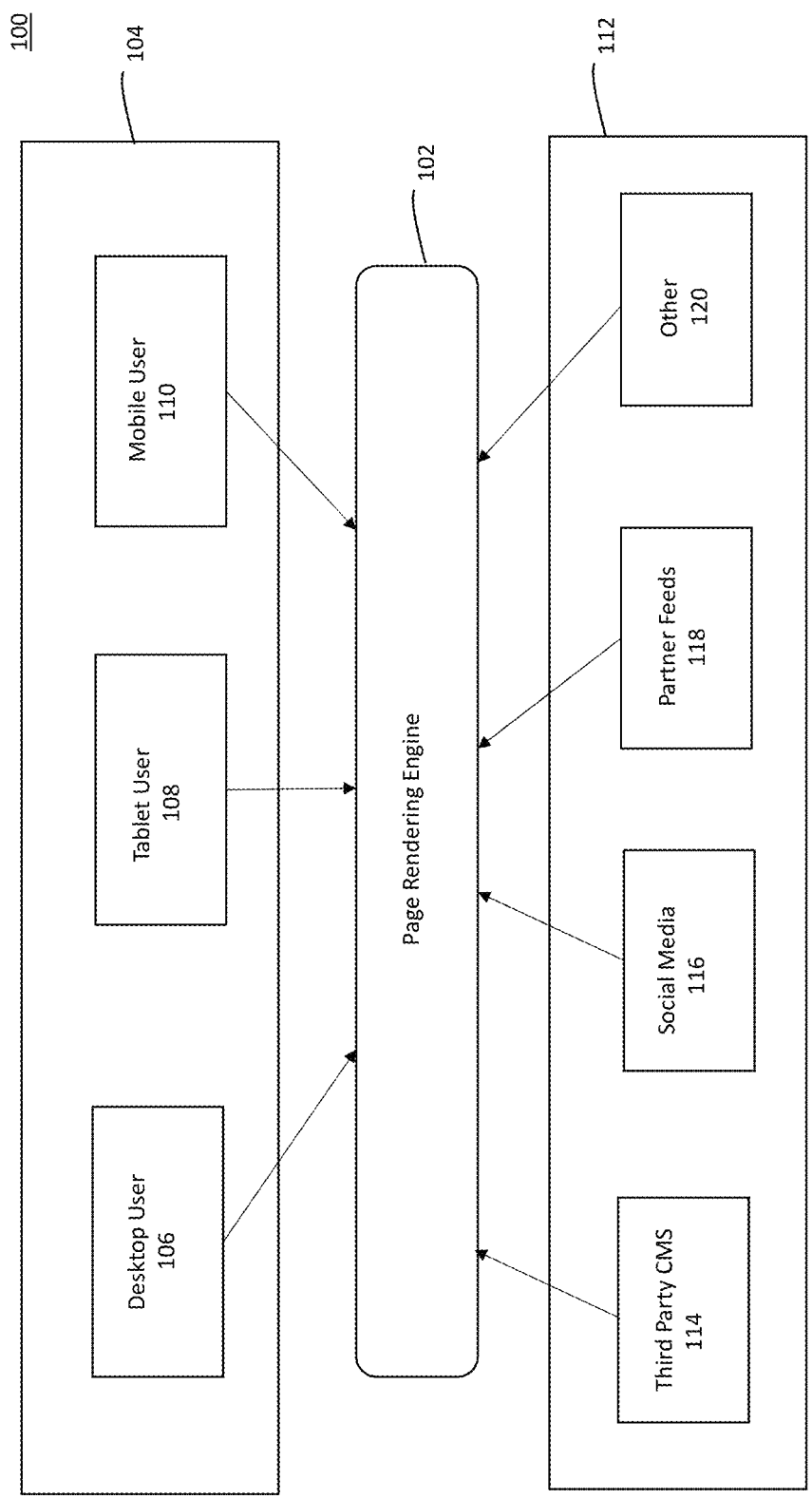
FIG. 1 is a high-level schematic of a system including a page rendering engine according to some embodiments.

The basic architecture of a page rendering system 100 according to one or more exemplary embodiments is schematically illustrated in FIG. 1. A page rendering engine 102 operates to render web pages on any of a plurality of types of web-accessing devices 104 being used by one or more end users (e.g., reader of the web pages). A desktop computer 106, a tablet 108, and a mobile device 110 are shown in FIG. 1 as example web-accessing devices used by end users. It will be understood, however, that page rendering engine 102 is not limited to rendering pages in a browser. For example, some embodiments can produce any text based rendering that is available through digital channels, including, e-mail's, RSS feeds, and other programmatic formats that can be used by downstream applications such as, for example, mobile and tablet native apps. The page rendering engine 102 operates to obtain information, including content that is subsequently rendered on the web-accessing devices 104, from various content providers 112. Content providers 112 may include web authoring platforms such as WordPress™ 114, social media platforms (e.g. Twitter™, Facebook™, Google+™ etc.) 116, partner feeds (e.g., news organization feeds, stock market feeds, etc.) 118, and other content providers 120 such as, for example, arbitrary databases (Washington Post™'s recipe database, election results etc.), quiz and poll platforms, digital asset management systems (such as, for example, video and photo content management systems). Thus, as illustrated in FIG. 1, the page rendering engine 102, takes as input, content from various content providers 112, and subsequently renders web-accessible pages, which include the content obtained as input, on various devices 104 for consumption by end users of the web site.

Web pages rendered by the page rendering system 100 are made up of "page features"—which are modular components, like, for example, the navigation bar, header (e.g., page header, section header, etc.), a piece of content (e.g., an article body, an article header, an article, a video clip, etc.), or widget (e.g., a clickable icon for downloading an identified content, a social media share button, etc.). A web page includes page features arranged in a particular manner. Rendering a web page includes, determining an arrangement of plural features in a desired manner, and then writing the various page features according to the arrangement and with corresponding content to the device of an end user. The rendering may proceed by first rendering each page feature individually, and then rendering the page containing all the page features. In some embodiments, although a page feature is included in a page it may be selectively excluded at rendering. Also, in some embodiments, page features may have variances that are resolved when the page is rendered. For example, a page feature to display an image may be capable of selecting from among several images, and this selection of the image to display may be resolved at the time when the page is rendered. When the page rendering system 100 is deployed at a media services organization, page features are typically built by developers at the media services organization, and are added to web pages through the web administrative interface (web admin interface). When a page feature is added to a web page, it is referred to as an "instance of a page feature." An instance of a page feature includes the page feature, as built by the developer, and the configuration and/or content that has been associated with the page feature through the web admin interface.

The modularity offered by page features in example embodiments enable a page rendering engine to have the capability of user configuration of page features, integration of external content sources with individual page features, etc. In embodiments, page features may be customized and/or new page features added. Moreover, in embodiments, it is not required to produce the content rendered by page features internally in the system, and can obtain content from any external server or service.

Each page feature can be logically connected to a piece of data in a content management system (CMS) or other source. When a developer is building a page feature, the developer can specify at least one type of content to use in the page feature. The system may be configured such that one or more base types are included for each page feature by default. For example, a page feature can specify that it is configured to handle one or more particular types of content (e.g., gallery, a link to social media etc.). Subsequently, page features are matched, based on their specified handling capabilities, with content that require such capabilities. In some embodiments, the developer can define custom types, in place or in addition to any types provided by default. According to an embodiment, an extension module can be used for defining such custom types. When a default type is used, the page rendering engine will already know, based on some predetermined configuration, how to retrieve it. When a custom type is used, the developer who builds the custom type should also build, or specify to the system how to obtain, the logic to fetch the custom type.

When a page feature is being placed on a page or template during the design of a web page, the client (e.g., web site/page designer) may specify some configuration data that is meaningful to the content type, and the page rendering engine will handle retrieving the content. For the content, for example, aspects such as a URL or the like where the content resides, and am indication of the type of content can be specified. The client may place a page feature that can handle the specific type of content on a web page. That is, where the system already includes a page feature that can handle the particular type of content, that page feature may be added to the web page. In case there are no currently existing page features that can handle the particular type of content, then the client may create a new page feature to access the particular type of content. The logic, supplied by the developer who enabled the integration with the third party system is directly executed by the page rendering engine's content service. This logic may be responsible for (1) retrieving the content from the source, and (2) converting it into the appropriate object that matches the requested content type.

The page rendering engine, used in embodiments, may not include a CMS, and may be considered as the presentation layer for any number of CMSs or other data sources. The page rendering engine, according to at least some embodiments, is functionally detached from any CMS or data source.

In another exemplary embodiment, a newspaper organization (e.g., a media services organization such as the Washington Post™) may use a page rendering engine, such as page rendering engine 102, as its single, unified, rendering solution for one or more of its online website(s). We pages and content that are added to the site (or sites), whether it is a recipes microsite, articles, or a homepage, are built as a set of page features, and the page rendering engine performs operations implementing the functionality to bring the various contents and other aspects together so that the web-page as seen by the end users of the web site(s) is rendered.

Conventionally, as noted above, integration with third party content was achieved by first "importing" the third party content into the system, such that it is available within the page rendering system as first party content. The embodiments described herein avoid the need to import and transform third party content into first party content.

Some embodiments enable developers to quickly create services that pull in content from other systems without having to worry about the mechanics that refresh content from the source system. It also makes the implementing system more resilient, because stale or expired content can be served by the system according to embodiments, even if the source of the content is down (e.g., temporarily non-operational and/or offline). For example, a newspaper production application may use an embodiment to fetch data from an external CMS. The developer who builds the integration may only be required to create the logic to get the content from the external CMS. The page rendering engine automatically handles the logic of updating from the source system, and in the case that the external CMS becomes unavailable, the page rendering engine according to embodiments will asynchronously update the content from the external CMS while continuing to serve the most current, although stale, content, and thereby keep the web site available. In some embodiments, after having served the stale content from the cache in response to the first request within a specified time period for that content, the cache may be updated asynchronously so that subsequent requests are serviced with newly updated content.

The page rendering engine, according to some embodiments, integrates natively with any external content or data source through a Content Service Platform, a technology foundation, which enables the following:

retrieving and receiving content (data) from external data sources such as a web service;

storing and caching content within the page rendering engine; and updating content within the page rendering engine for rendering to users viewing the content via a range of devices.

The page rendering engine, according to embodiments, does not require modification by the developer in order to connect to each new data source. This capability, in many aspects, future-proofs the page rendering engine platform in an environment where content and web services in the back-end/data source landscapes are frequently changing and where end users (readers of the web sites) seek new and innovative content across their devices. When a media site wants to offer its end users (i.e., readers and other visitors of its web site(s)) a content from a new content source, they face no file format restrictions using the page rendering engine's native integration with arbitrary data sources. Moreover, there are no core or system changes that need to be made to the page rendering engine platform each time a new data source is used. The page rendering engine, according to some embodiments, provides this seamless integration capability by supplying two separate bundles of logic and/or configurations:

a content resolver; and a data access service.

These bundles of logic may be provided as separate library files. The page rendering engine uses the content resolver and the data access service components to directly integrate with a new content source. Additionally, the page rendering engine offers a set of tools that support developers in creating these integrations. In particular, the page rendering engine is configured to cache (i.e., store locally) the external content to ensure that it is available quickly for subsequent presentations.

The technique employed in the page rendering engine for caching, provides the developer with a high-level of customization and configurability. The developer may configure the caching technique to programmatically determine the amount of time the content will be cached before it is updated. In some embodiments, the caching is configured so that, for a given piece of content, the update time increases based upon the decrease in the access frequency for that given piece of content. That is, when a content is new and it is accessed frequently, the cache may be updated frequently, but as the time that the content has been available increases, the system may, rather than expend resources to update the cached version of that content frequently when only a few requests are being made for that content, decrease the frequency with which the cache is updated. This allows developers to specify longer or shorter periods of caching based on any arbitrary logic. Also, the page rendering engine's Content Service Platform is responsible for refreshing and/or receiving updates to content based on the logic specified by the developer. These capabilities being provided by the page rendering engine (e.g., provided in code/modules that are separate from those provided by the developer), frees the developer from creating the techniques for obtaining content for the page rendering system, determining how and where to cache the content, and updating the content as necessary. The page rendering engine abstracts all of this away from the developer in the context of rendering a web page, thereby greatly minimizing the effort required on the part of the developer to render content on a web page.

An example implementation may illustrate how a new content source can be integrated in accordance with some embodiments. Consider a scenario where a new blogging platform comes online and gains a significant online presence. A news site using page rendering system 100 desires to integrate content from this new blogging platform into their online news coverage. An editor of the news site can request a developer to write a data access service that can connect the page rendering engine 100 to content on the new blogging platform. In some embodiments, in order to obtain content from a new source, the developer may only be required to create a data access service (a bundle of logic), which the content service platform then invokes to connect the page rendering platform with the new data source. The data access service enables developers to focus on writing the bare minimum amount of code necessary to describe how third-party data should be accessed and enables the page rendering engine to handle everything else.

The developer may create the data access service using, for example, Java, Ruby or Python programming languages. There is no proprietary programming or scripting languages involved in creating the data access service regardless of the data to be integrated into the page rendering engine 100. Page features are created using Hypertext Markup Language (HTML), JavaScript, and Cascading Style Sheets (CSS).

Another example implementation may illustrate consuming legacy site content into the page rendering engine 100. An online media site operating a legacy CMS traditionally faces a long and expensive professional services engagement to port their content into a new CMS or new content delivery platform. Such migrations have meant being locked-in to legacy content platforms for some small to mid-size online media sites, cutting them off from further technology innovation that can drive traffic to their sites. The page rendering engine 100 does not require such migration from a legacy CMSs. Rather the online media site can have a developer configure the page rendering engine 100 to consume content (i.e., without an initial and separate migration step) from the online media site's existing content repositories and/or legacy CMS into the page rendering engine 100 platform.

In order to achieve the above, once the editorial team of the news site identifies content for use in the page rendering engine 100 platform, a developer may write a data access service (a bundle of logic) to render the identified content from the legacy content in the page rendering engine 100 system using JavaScript, HTML, and CSS. The page rendering engine 100 may be configured to integrate with any web services, file services, and/or local databases, including those that are popular and industry standard.

Figure 5:
FIG. 5 illustrates an example dynamic form interface provided in some embodiments of the page rendering engine.

Embodiments may specify content for page features. An editorial staff member may specify dynamic content for a page feature using an online dynamic form provided by the page rendering engine 102 to configure the content. FIG. 5 illustrates an example dynamic form in which, among other things, one may specify the content to be retrieved from an external source. For example, an editorial staff member and/or developer can specify the path of a cloud-based content repository where the text of an article to be rendered resides, in order to render the specified cloud-based content on the selected web-page rendered by the page rendering engine 102.

The editorial staff member and/or developer then has the option to specify other data sources to power other features. For example, a sidebar feature is a type of page feature that is provided by at least some embodiments of the page rendering engine 100. The editorial staff member and/or developer can specify an identifier (e.g., a predetermined content ID) for that content following a process similar to how the article in the above example was configured to be rendered. The page rendering engine 102 renders the sidebar content within the sidebar feature independently of the other features on the web page. That is, other than how the various page features are arranged on the web page in relation to each other, each page feature can be rendered independently of each other.

The content that is rendered by the page rendering engine 102 can be of any type such as, but not limited to, news items or articles including one or more of text and/or multimedia content, photos, video clips, text and/or multimedia streams and the like. In embodiments, the content to be rendered may be chosen on a per-feature basis to appear on a selected rendered page. Each page feature may be implemented in the page rendering engine 102 as an independent element that is not tied into a particular page positioning. In a typical configuration, the editorial staff member and/or developer selects a page feature and decides what content (e.g., content from a particular third party content source) would power that page feature. In some embodiments, although an ordering is specified in a web page for page features, the retrieval of content is not affected by the ordering.

The page rendering engine 102 may be configured to use a particular object format by default. Some embodiments may, for example, by default use JavaScript Object Notation (JSON), and with native support in page rendering engine 102 for JSON, the page rendering engine can parse data (content), convert the parsed content to an content object and make the content object available to be used while rendering a page feature, thus providing for importing JSON objects directly into the page rendering engine without supplying additional logic. In some embodiments, the retrieved content may be converted from the source format to the format of the target on which the content will be rendered without an intervening conversion to an intermediate format. In some embodiments, an XML file of content from a source may be directly converted to a format of the target while still preserving the XML schema for that content. The page rendering engine 102 can be configured to support Extensible Markup Language (XML) output in order to support publishing requirements.

Figure 2:
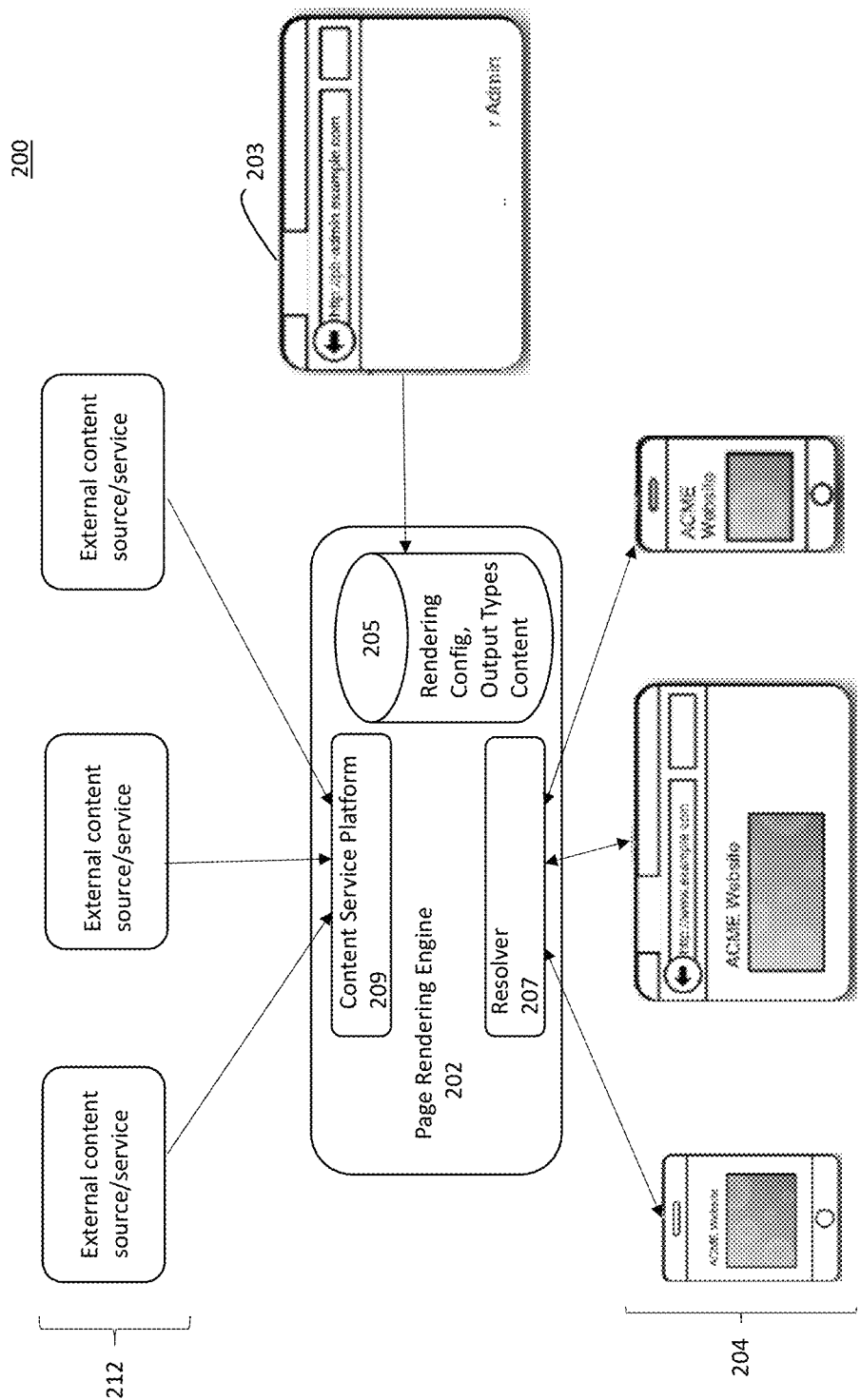
FIG. 2 illustrates some interfaces provided by the page rendering engine according to some embodiments.

FIG. 2 is a further schematic illustration of the architecture of a page rendering system, according to some embodiments. Page rendering system 200 includes page rendering engine 202, web admin interface 203, interfaces to external services 212 and interfaces to access devices 204.

As illustrated in FIG. 2, the page rendering engine 202 may use JSON to integrate data from any number of external services 212 for rendering across any combination of web browsers, mobile devices 204, or other render targets. External services 212 in FIG. 2 represent external content sources including web services, rich media, and textual content from which the page rendering system 200 renders, using, for example, HTTP, content for user consumption across devices 204. The interaction and/or control of the page rendering engine 202 using the web admin 203 may be provided using configured and/or configurable information such as, for example, rendering feature configurations, output type configurations and/or content configurations. For example, an editorial user may place a page feature onto a page, that feature will include a variety of options that have been configured by the developer. The editorial user can use a web form to modify the rendering options, and when the feature instance is being rendered those option values will be considered and result in an appropriate rendering. For example, a page feature may have a headline of an article to be rendered in a specific font type. Embodiments enable the editorial user to change how this headline is rendered with the font, for example, by specifying that the headline should be rendered in bold font. Also, in the above example, the editorial user may supply a specific content ID in the content configuration for the instance of the feature. When the feature is being rendered, the page rendering engine will invoke the content service and pass the requested content ID to the feature code during rendering. Also, the editorial user may request a specific output type configuration for the page or template. Page features can behave differently depending on the output type that has been selected, for instance, the page feature may use different templates for mobile and desktop client output types. The templates may specify, for example, aspects such as the size of the display screen, page feature arrangement on a page, font sizes, etc. The integration of external sources 212 to the page rendering engine 202 may be provided by content service platform 209. The interaction with the access devices 204 may be controlled by a resolver 207.

Figure 3:
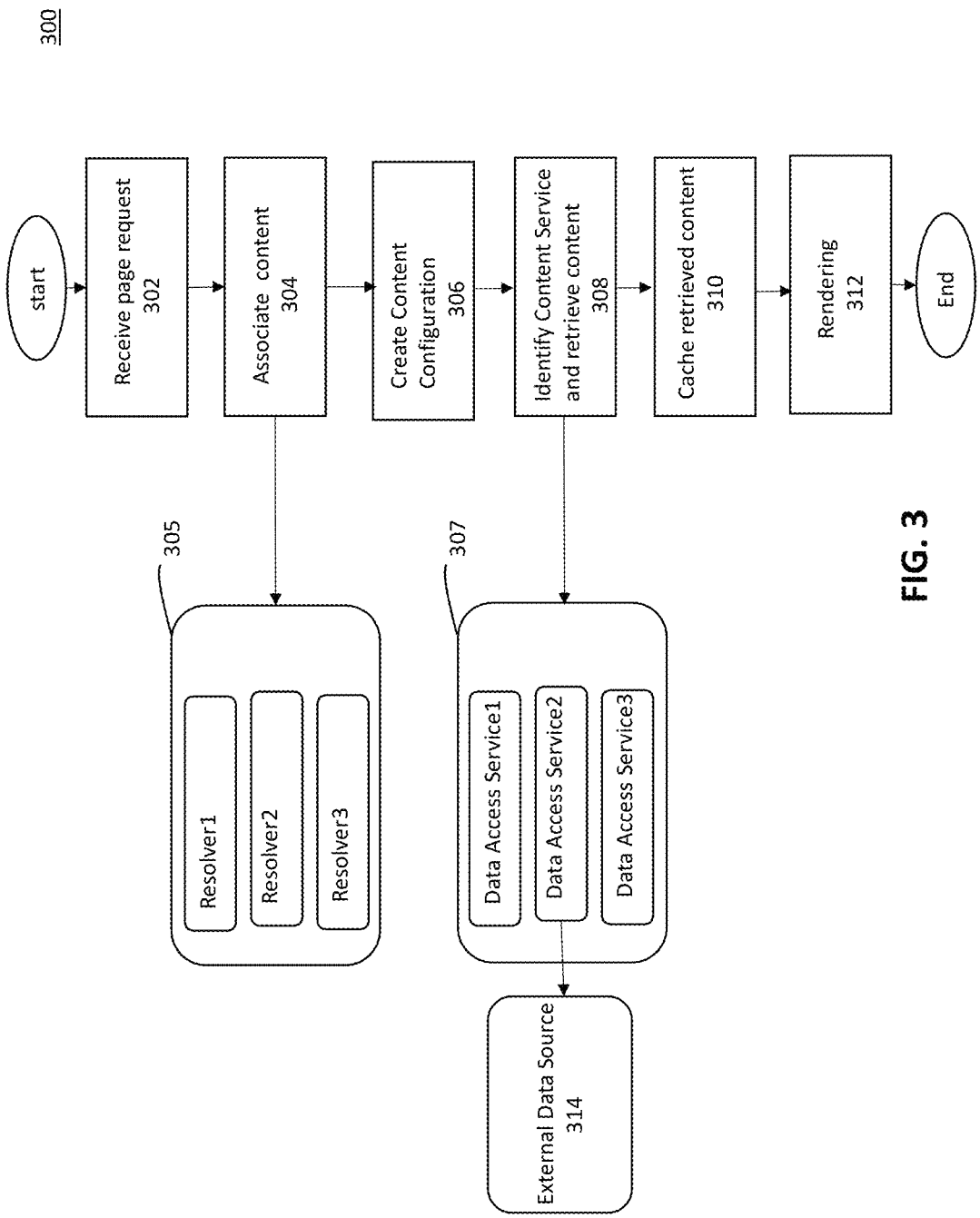
FIG. 3 illustrates a flowchart of a method of rendering a web page, according to some embodiments.

FIG. 3 is a flow diagram of a process 300 for rendering a web page by a page rendering engine according to some embodiments, such as page rendering engines 102 and 202. A person skilled in the art would understand that operations 304-312 of process 300 may be executed sequentially, and/or that some operations 304-312 may be executed in parallel, in causing a web page to be rendered. In addition, process 300 may be executed on one or more processors of one or more computers.

Process 300 is entered when, at operation 302, a request is received for rendering a web page. For example, an end user using an access device such as a tablet computer attempts to access an article listed on the homepage of a news web site. At operation 302, a request for rendering a web page is received at the page rendering engine. The request specifies at least the web page desired by the end user. This information to be included in the request can be identified by the end user-side device when, for example, the user clicks on (i.e. selects) a link to particular page feature that is arranged on a rendered web page. Any value or combination of values included in the request (e.g., such as the User-Agent or other HTTP Request values as identified, for example, in http://www.w3.org/Protocols/rfc2616/rfc2616-sec5.html may be used by the page rendering engine 202 in subsequent processing.

At operation 304, content association is performed by the page rendering engine. The page rendering engine has, based upon page features defined for that web page, information such as the location, type etc., for each content that is arranged on the web page accessed by the end user. During operation 304, the page rendering engine identifies a suitable content resolver for the requested web page. For example, the page rendering engine may search through a plurality of content resolvers to identify a suitable content resolver which can be used for the current content access. In at least some embodiments, a plurality of content resolver objects 305 are searched in order to identify a suitable, or in some embodiments the most suitable, content resolver object. Content resolvers contain two elements: (1) a priority, which helps determine which resolver should win in case of an overlap (e.g., where two resolvers match a request) and (2) a bundle of logic that runs against the request and returns a value object (or pointer/identifier to an object) in case of a match or null in case the resolver does not match the request. In some embodiments, the priority value, and the bundle of logic are included as elements in the bundle of object. Having each resolver object include the logic provides improved efficiencies and flexibilities. in the process of request resolution, the resolvers are all ordered by priority and the request is run sequentially through a chain of resolvers. The first resolver that matches the request returns instructions for the page rendering engine to continue processing the request (e.g., the template to use, the content to retrieve, etc.), the process may be short-circuited after the first match, and the other resolvers are not invoked. The content resolver objects may be stored in a manner that is efficient for fast access and/or search. In some embodiments, the search of the content may be performed by sequentially checking each content resolver to determine if it matches one or more predetermined criteria. For example, when a request for a page is received, based upon the URL (and optionally other header information received with the request such as accessing device) and depending on the configuration, the resolver to be used is determined. The selected resolver determined which page to render and the content to be served. This enables the system to serve different types of pages (e.g., page features, content or pages tailored for mobile devices etc.) based on aspects such as the accessing device. This ordered and structured approach is advantageous as it allows the implementer or administrator of the page rendering engine to define broader resolvers that cover wide swaths of requests and then layer on more specific resolvers, with a higher priority, as necessary. In this way, it is possible to quickly segment off a specific set of requests to have a different behavior without modifying other resolvers.

At operation 306, a content configuration is created for the requested web page using the identified content resolver. The content configuration is created based upon attributes of the identified content resolver. A content configuration object is a value object that contains a set of attributes that are used by (1) the data access service during content retrieval and (2) by the content service to determine the "cache key" (the value used to identify the cached entity). The content resolver is responsible for creating a content configuration object using the properties of the request, this is contained in the value object returned to the page rendering engine from the content resolver and is passed to the content service down-stream. An example interface for the content resolver is shown in FIG. 6 item 602.

At operation 308, the content configuration created at operation 306 is provided to the content service (e.g., content service platform 209) of the page rendering engine. At least some of the data access service objects may be provided by the developers when they associate new content sources with the page rendering engine. The page rendering engine identifies a data access service based upon the content configuration. In some embodiments, the data service is identified from among a plurality of data access service objects 307. The data access service may provide a single method (function) that accepts a content configuration object, executes developer provided logic to retrieve the external content, converts it into a native entity of the page rendering engine, and returns it back to the page rendering engine for down-stream use. An example interface is shown in FIG. 6 item 604.

The selected data access service is then used to retrieve/obtain content from a data source, such as, for example, external data source 314.

At operation 310, content that is retrieved and/or obtained in some other manner is cached. The caching may be automatic. For example, all data for display received from the external data source 314 may be automatically cached. The memory in which the retrieved content is cached may be local to the page rendering engine, or may be located at another device which is efficiently accessible by the page rendering engine. The cache may be maintained in accordance with configuration settings made by the content service. For example, cached items from a particular source (or particular types of content from that source) may be marked as stale upon expiration of a time interval for each item, according to a parameter configured when that source was associated with the page rendering engine.

At operation 312, the page rendering engine produces the rendering of the requested web page. The actual rendering is performed by an upstream service of the page rendering engine. For example, the actual rendering is based upon the specific devices/types, thus enabling the providing of a respectively configured web page for each device.

The page rendering engine may be such that the content resolvers 305 and data access services 307 are provided by developers as they integrate various content to be delivered via the page rendering engine. Each content resolver includes logic and/or configuration that enables the page rendering engine to identify which content maps to a particular request, and logic and/or configuration that enables the page rendering engine to communicate with an external system and retrieve the selected content. This provides a substantial improvement over the conventional techniques by requiring the developers to provide only the content resolvers and data access services, so as to enable the page rendering engine to obtain information from any content source.

At least some embodiments provide for programmatic configuration of update frequency from external content sources and asynchronous updates in order to enable developers to configure the page rendering engine to support a full range of content update frequencies. The updates may be directed to updating the cached information accessed by the page rendering engine during rendering. Such flexibility in receiving updates is desirable in many applications. For example, such flexible update schedules would enable receiving even mundane changes to major news updates where site content must come from the latest sources with zero caching, while simultaneously receiving updates at much slower rates for other portions of a web page, such that optimal use of network capacity and/or machine processing capacity is used during the display of a web page.

The content service platform module of the page rendering engine, enables developers to configure and programmatically change the strategy that page rendering engine uses to update content from third party sources. In some embodiments, any content that is not in the page rendering engine is considered as third party content regardless of whether it is from an internal content repository or subsystem that is under the media site's management and/or control, a third-party real simple syndication (RSS) feed or another content type. The page rendering engine may be configured to use a Java Archive (JAR) file, a package file format typically for aggregating many Java class files and associated metadata and resources, to implement the configuration of update frequency. There may be one JAR file per update frequency configuration. In some embodiments, a library format other than JAR may be used.

Figure 4:
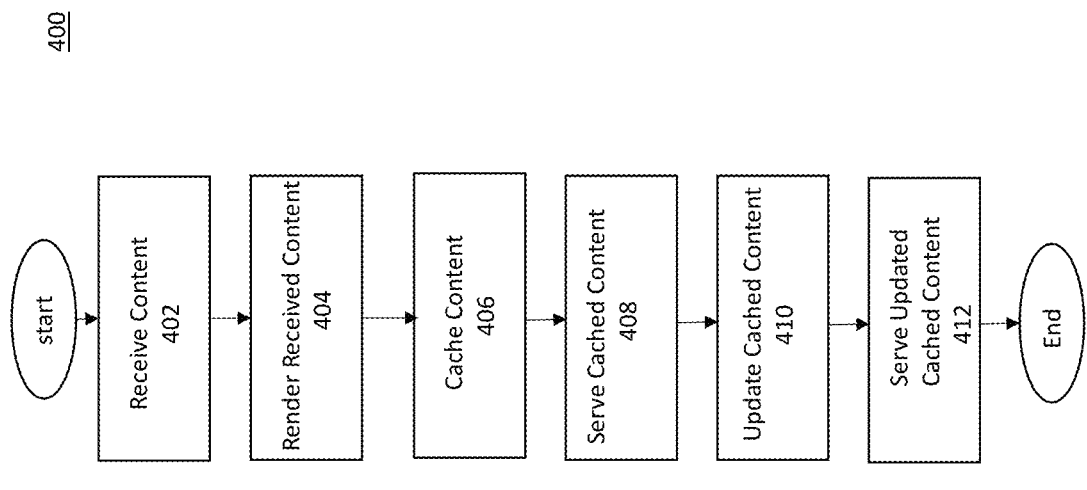
FIG. 4 illustrates a flowchart of caching render content according to some embodiments.

FIG. 4 illustrates a flowchart of a process 400 for the page rendering engine to update the cache and to renders third-party content.

Process 400 may begin when third party content flows into the page rendering engine at operation 402. This may occur in response to an end user request for a particular web page and/or content. At operation 404, the page rendering engine renders the content to the requesting end user's device.

At operation 406, the page rendering engine caches the content. The caching may be controlled by configurations. For example, configurations may define, for each page feature, content source and/or content type, whether the corresponding content should be cached. The caching would preferably store the content to a memory local to the one or more processors of the page rendering engine, or to some memory that is capable of being accessed substantially faster than retrieving the content from the corresponding source.

At operation 408, the page rendering engine serves the cached content to the next end user who accesses the web page. In this embodiment, upon an end user request for a particular content, the cache may be always checked first for that content.

At operation 410, the page rendering engine updates the cached content in the background either asynchronously or synchronously. As described above, embodiments provide a variety of configurable options for keeping the cached content refreshed.

At operation 412, the next end user accessing the web page is served the updated content from the cache. The update strategy can be configured to refresh content synchronously or asynchronously from the content source. Update frequency can be pre-set or can be adjusted dynamically. The typical media site, such as, for example, a newspaper site, serves a high percentage of stale or "evergreen" content such as stories, blog posts, and other media features. For such "evergreen" content, the page rendering engine serves content from its cache and may check for new content asynchronously upon request. If end users never request a certain story on the web site, the page rendering engine may never update that story content in the cache from the content source.

The programmatic configuration of the update frequency enables content that is served by the page rendering engine to be highly resilient and consistent, even in the event a necessary third party data source is unavailable or experiencing higher than acceptable latency. The highly configurable cache updates may be implemented using either one master clock implementation that would control the update of all content in the cache, or by using a respectively configured clock for each content source whose data is currently in the cache.

A few example operational scenarios in which a page rendering engine according to an embodiment is used are described below.

In a first example scenario, a copy editor of a news organization updates a story to correct an error. For example, the copy editor may make a change to a story that has already been published through a page rendering engine according to an embodiment. The desired edit could include any type of edit, such as, for example, a minor grammatical correction to updating the article or fixing a factual error in the article. Web site content in this case is typically either "evergreen" or stale meaning that site updates are not a frequent occurrence.

In the example scenario, the copy editor updates the content at the source which is considered external to the page rendering engine. When an end user first requests the article via the web page after the article is updated/revised, that end user may view the unedited version (e.g., from the current cache of the page rendering engine). However, that read request by the end user triggers the page rendering engine to fetch the updated content for republishing. The next end user requesting the web page receives the updated story. In conventional systems the rendering is based directly from a local database—i.e., the content is stored locally to the system. The page rendering engine according to embodiments offers a distinct separation between content creation and presentation, which allows integration to various different content systems and significant improvements to resiliency due to the asynchronous update strategy.

In a second example scenario, a media site publishes a story about a winter storm. Accurate winter storm coverage requires that the editorial staff concerns itself with managing timely updates to news coverage. During the storm coverage, the page rendering engine according to some embodiments may continue retrieving content from a range of third party content sources. One content source in this scenario may be a third-party weather news feed that is currently experiencing a very high level of new traffic due to the weather caused a higher than expected level of latency.

In the second example scenario, updates to articles around the winter storm coverage can be configured in any time increments (for example, 10 minutes). A developer can then return storm content (e.g., the page feature corresponding to the storm content report) to a default update frequency after the storm concludes.

A third example scenario is a media site covering an annual event of local or national importance. A media site is covering an annual event and wants to ensure that its readers receive the most up to date content during the course of the event. For example, in the case of a local or national election, news can be changing on a moment-by-moment basis on many different election fronts during the course of the election. Accurate and timely site updates are key to successful election news coverage for the media site.

A developer can configure the content update frequency regarding the event to update on a preset frequency during the time frame of the event. The configuration can also cease updates at a predetermined time at or near the conclusion of the event. The page rendering engine would then return to the default update frequency for the event content.

A fourth example scenario is a media site covering a catastrophic event. A catastrophic event of national or global significance occurs making it important for readers of a media site to receive the most up to date information about the event. The editorial staff can direct a developer to configure the page rendering engine according to an embodiment to update the selected content always to ensure that its readers are always viewing the most up to date content.

A developer can configure the page rendering engine to update content related to the event coverage from the source content directly bypassing the cached content. This approach, although expected only to be used rarely, illustrates the range of configuration options in a page rendering engine according to embodiments available to support the programmatic configuration of update frequency from external content systems via synchronous and asynchronous updates. Once the catastrophic event is over, a developer can reset the content to a default update frequency. In some embodiments, this reset of configurations may be automatic.

A fifth example scenario is the integration of a new content source. A new blogging platform may come online and gain a major online presence. A news site standardized on a page rendering engine according to an embodiment may want to integrate content from this new blogging platform into their online news coverage. An editorial staff member can request a developer to write a data access service that can connect the page rendering engine to content on the new blogging platform.

The developer creates the data access service using Java, Ruby, Python or like language. There is no proprietary programming or scripting languages involved in creating the data access service regardless of the data to be integrated into the page rendering engine platform.

A sixth example scenario relates to consuming legacy site content into a page rendering engine according to some embodiments. A media site using a legacy CMS traditionally faces a long and expensive professional services engagement to port their content into a new content delivery platform. Such migrations have meant content platform lock-in for some small to mid-size online media sites cutting them off from further technology innovation that can drive traffic to their sites. There is no such migration from a legacy CMS to the page rendering engine according to embodiments. Rather the online media site can have a developer configure the page rendering engine to consume content from the online media site's existing content repositories into the page rendering engine platform.

Once the editorial team identifies content for migration to page rendering engine, developers write a data access service (a bundle of logic) to render the legacy content in the page rendering engine using JavaScript, HTML, and CSS. The page rendering engine can integrate with popular and industry standard web services, file services, and local databases.

A seventh example scenario relates to specifying content for feature stories or articles. An editorial staff member specifies dynamic content for a story or article feature using an online dynamic form to configure the content. For example, an editorial staff member can specify the path of a cloud-based content repository where the article text resides to render the content on the selected web page to be rendered by the page rendering engine.

The editorial staff member then has the option to specify other data sources to power other features. For example, the page features may include a sidebar. The editorial staff member can specify a content ID for that content following a process similar to how they configured the article to render. The page rendering engine renders the sidebar content independently within the sidebar feature.

Content is chosen on a per-feature basis to appear on a particular page rendered by the page rendering engine. Each feature is an independent element unrelated to page positioning. The editorial staff member may select a feature and decide what content powers that feature. In some embodiments, however, when a page is requested the page rendering engine may create a global content object. The editorial user may be allowed to indicate whether or not the feature should inherit properties from the global content (e.g., a feature may be a headline feature, and the global content may be a story, if inheritance is selected, the story content object will be merged with the feature content).

It will be appreciated that although many of the embodiments are described in the context of media or news services, embodiments are not restricted thereto and may apply to any content that is rendered using a web platform or the like. It will also be appreciated that as used herein, the terms system, subsystem, service, logic circuitry, and the like may be implemented as any suitable combination of software, hardware, firmware, and/or the like. It also will be appreciated that the storage device locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein, for example, in relation to the page rendering engine 202, may be accomplished by having a computer processor execute instructions that may be tangibly stored on a computer readable storage medium. The computer running the page rendering engine 202 may communicate over one or more network interfaces with client and/or end user devices 104, and also may communicate over one or more network interfaces with external sources 112. Processes 300 and 400 may be implemented on the processor of the page rendering engine 202, based upon stored program instructions, while having resolvers 305 and data access service modules 307 in a memory accessible to the page rendering engine 202. Configuration screens such as that shown in FIG. 5 may be displayed on any client/end user display device.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising:
   a memory;
   a network interface; and
   a processor configured to:
      receive a request for displaying a web page on an end user device;
      identify a plurality of page features for displaying the web page;
      select, respectively for each of the identified page features, a corresponding content resolver from a plurality of content resolvers stored in the memory, wherein the content resolver object corresponding to the identified page feature specifies a respective selection information and a respective indication of an external content source, wherein the selecting being at least in accordance with the end user device and evaluating the respective selection information of two or more of the plurality of content resolver objects with respect to the identified page feature;
      using the respective indication of the external content source included in the selected content resolver object, obtain the content from the external content source via the network interface;
      render, in accordance with the one or more parameters, said obtained content on the web page for display on the end user device; and
      transmit, via the network interface, the rendered web page for display on the end user device.

2. The system of claim 1, wherein the selecting of the content resolver object corresponding to an identified page feature comprises:
    comparing one or more characteristics of the identified page feature to characteristics of each of the plurality of content resolver objects.

3. The system of claim 2, wherein the content resolver objects each is associated with a respective priority value and a respective instruction logic, wherein the selecting further comprises running the received request against the respective instruction logic of respective ones of said plurality of content resolver objects ordered in accordance with the respective priority value of each of said plurality of content resolver objects.

4. The system of claim 2, wherein the comparing is in accordance with logic specified respectively in each of the plurality of content resolver objects.

5. The system of claim 1, wherein the rendering comprises:
    directly converting, during the obtaining, the content from a first format to a second format used by the end user device for the displaying of the web page, wherein the content is stored in the external content source in the first format.

6. The system of claim 5, wherein the directly converting is in accordance with the specified one or more parameters.

7. The system of claim 1, wherein the processor is further configured to:
    select, for the identified page feature, a corresponding content source access logic bundle from a plurality of content source access logic bundles; and
    retrieving, using the corresponding content source access logic bundle and using a content configuration object created by the content resolver object corresponding to the identified page feature, content for the identified page feature.

8. The system of claim 7, the processor is further configured to:
    cache the retrieved content, the cached content having been directly converted from a first format in which the content is stored in the external content source to a second format different from the first format; and
    subsequently, provide the cached content for rendering for displaying on the end user device.

9. The system of claim 8, the processor is further configured to:
    periodically update the cached content.

10. The system of claim 9, the processor is further configured to:
    periodically update the cached content using a first update interval for a first page feature of the web page and a second update interval for a second page feature of the web page.

11. The system of claim 1, wherein the plurality of page features include one or more of a navigation bar, page header or widget.

12. The system of claim 1, wherein the specified one or more parameters including one or more of a type of said end user device or dimensions of a display area on said end user device.

13. The system of claim 1, wherein logic for accessing the content from the external content source, logic for the corresponding content resolver, and logic for updating a cache of the content are in separate program libraries.

14. A method comprising:
    receiving a request for displaying a web page on an end user device, wherein the request identifies a type of the end user device;
    identifying a plurality of page features for displaying the web page, each of the page features being configured to be associated with content from a respective content source and to be arranged on the displayed web page;
    select, respectively for each of the identified page features, a corresponding content resolver from a plurality of content resolvers stored in the memory, wherein the content resolver object corresponding to the identified page feature specifies a respective selection information and a respective indication of an external content source, wherein the selecting being at least in accordance with the end user device and evaluating the respective selection information of two or more of the plurality of content resolver objects with respect to the identified page feature;
    using the respective indication of the external content source included in the selected content resolver object, obtain the content from the external content source via the network interface;
    render, in accordance with the one or more parameters, said obtained content on the web page for display on the end user device; and
    transmitting the rendered web page for display on the end user device.

15. A non-transitory computer readable storage medium having stored thereon instructions which, when executed by a processor, causes the processor to perform operations comprising:
    receiving a request for displaying a web page on an end user device;
    identifying a plurality of page features for displaying the web page;
    select, respectively for each of the identified page features, a corresponding content resolver from a plurality of content resolvers stored in the memory, wherein the content resolver object corresponding to the identified page feature specifies a respective selection information and a respective indication of an external content source, wherein the selecting being at least in accordance with the end user device and evaluating the respective selection information of two or more of the plurality of content resolver objects with respect to the identified page feature;
    using the respective indication of the external content source included in the selected content resolver object, obtain the content from the external content source via the network interface;
    render, in accordance with the one or more parameters, said obtained content on the web page for display on the end user device; and
    transmitting the rendered web page for display on the end user device.

* * * * *